Feb. 3, 1959   R. VOGT   2,872,138
DEVICE FOR DECELERATING THE SINKING SPEED OF A DROPPED LOAD
Filed Aug. 23, 1956

*INVENTOR.*
RICHARD VOGT
BY Ralph B. Pastoriza
*ATTORNEY*

2,872,138

DEVICE FOR DECELERATING THE SINKING SPEED OF A DROPPED LOAD

Richard Vogt, Pacific Palisades, Calif., assignor to Aerophysics Development Corporation, a corporation of California Application August 23, 1956, Serial No. 605,855

2 Claims. (Cl. 244—138)

This invention relates generally to deceleration devices and more particularly, to an apparatus for decelerating the sinking speed of loads parachuted from aircraft.

Conventionally, cargo is dropped from airplanes by the use of parachutes. Since the required parachute size varies inversely with the square of the sinking speed, and inasmuch as it is desirable to minimize the parachute size, shock absorbing members are generally provided on the underside of the cargo. Such shock absorbing systems as have been employed to date are not only expensive, but result in additional weight.

Bearing the above in mind, it is the primary object of the present invention to provide a decelerating means for cargo parachuted from aircraft, which is relatively inexpensive, light in weight, and obviates the need for any type of heavy mechanical shock absorbers.

More particularly, an object of this invention is to provide a decelerating apparatus for use with parachuted cargo in which the decelerating force may be readily adjusted, whereby it is adaptable to cargo of different weights.

Still another object is to provide a deceleration system employing a standard sized rocket in combination with means for varying the effective thrust of such rocket so that it may be used equally effectively under different environmental conditions.

These and other objects and advantages of this invention are attained by providing a thrust means including a solid or liquid propellent rocket. The rocket is secured between a conventional dropping parachute and a cargo-carrying platform in such a manner as to direct its exhaust gases downwardly to provide an upwardly directed thrust force. Cooperating with the rocket are a pair of deflector plates hinged together in an inverted V shape and positioned a given distance below the rocket nozzle to intercept and laterally deflect the rocket gases. The angle of the lateral deflection with respect to the vertical is adjustable by changing the angle of the plates with respect to each other. By this arrangement, the effective vertical thrust component for any given rocket may be varied.

In operation, the rocket is ignited by a feeler extending from the lower end of the platform when the parachuted load is a certain distance from the ground. The effective vertical thrust is calculated to decelerate the sinking speed within this distance to a sufficiently low value that no damage occurs on impact.

A better understanding of this invention will be had by referring to the accompanying drawings in which.

Figure 1:
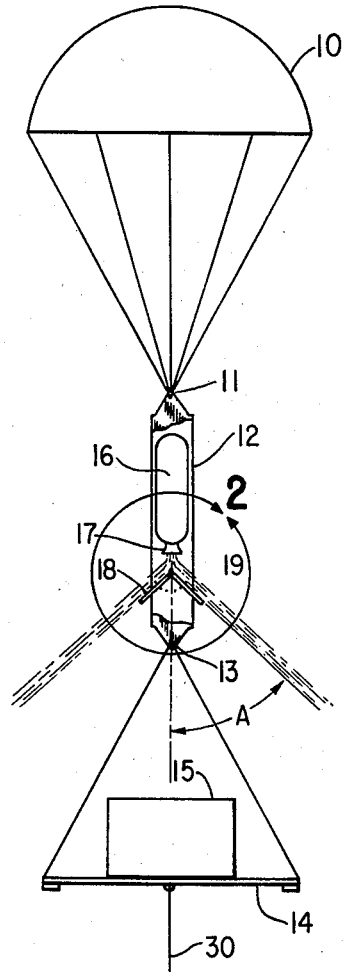
Figure 1 is a schematic elevational view of a preferred embodiment of the deceleration device as incorporated in a parachuted load.

Referring to Figure 1, there is shown a parachute 10 secured to its lower end 11 to a housing 12. The lower end of the housing 12 is in turn connected at 13 to a cargo platform 14 supporting cargo 15. The parachute 10 need only be of sufficient size to control the dropping of the cargo so that it assumes a relatively vertical position as shown.

In order to decelerate the parachuted cargo just prior to its impact with the ground, there is provided, in accordance with the invention, a thrust means preferably in the form of a solid propellent rocket 16, secured within the housing 11 and positioned with its nozzle 17 directed vertically downward. A pair of deflector plates 18 and 19 are positioned a short distance below the nozzle 17 of the rocket to intercept the rocket exhaust. The arrangement is such that the downwardly directed exhaust gas from the rocket is divided between the deflector plates and caused to follow diverging paths on either side of the housing 12. The angle of deflection of the rocket exhaust with respect to the vertical is indicated at "A" in Figure 1.

Figure 2:
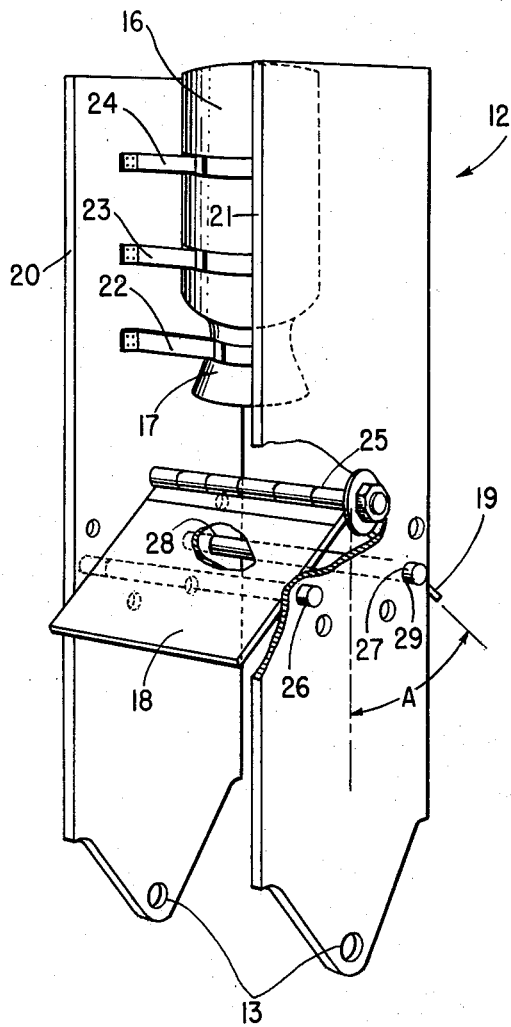
Figure 2 is an enlarged cutaway prospective view of that portion of Figure 1 enclosed within the circular arrow 2; and, Figure 3 is a vector diagram illustrating thrust forces.

Referring to Figure 2, the housing 12 is illustrated in greater detail as comprising a pair of parallel plates 20 and 21 between which the rocket 16 is physically supported as by support members 22, 23, and 24. The deflector plates 18 and 19 are supported and hinged together between the plates in the position of an inverted V, by hinge rod 25. The deflector plates are held at desired angles with respect to the vertical by means of horizontal support rods 26 and 27 passing through axially aligned openings in the plates 20 and 21, such, for example, as the openings 28 and 29 for the support rod 27.

In operation, a rocket of standard size, such as a rocket 16, is positioned in the housing 12 and the deflector plates 18 and 19 are adjusted to assume an angle such that the vertical component of thrust during the burning period of the rocket is sufficient to reduce the sinking speed of the particular cargo to a value sufficient to prevent damage to the cargo upon striking the ground. Since the weight of the cargo dropped will not always be the same and since the thrust characteristics of a standard size rocket vary with temperature conditions, the setting of the deflector plates will not always be the same for a given weight and parachute size. By suitably controlled experiments, a chart may be drawn up for a given standard rocket type setting forth the various angles at which the deflection plates should be set for a given parachute size, cargo weight, temperature, and other environmental conditions. It is a simple matter, accordingly, to accommodate different cargo weights by the deceleration device of this invention.

Any suitable means may be employed for igniting the rocket at a desired moment when the cargo is within a given distance of the ground. For example, a simple feeler 30 as illustrated in Figure 1 may be used and suitably connected to close a contact on striking the ground. Closing of such contact may complete an electrical circuit through a battery serving to operate a device for igniting the rocket. Such systems are well known in the art as exemplified by Patent No. 2,560,445 and need not be described or shown in detail here.

Figure 3:
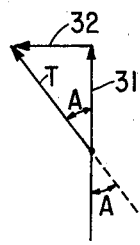

Referring to the vector diagram of Figure 3, the manner in which the vertical component of thrust is varied by changing the angle of the deflection plates is illustrated.

For example, if "T" denotes the lateral thrust from one side of the housing 12, the vertical component thereof will be represented by the vector 31 and the horizontal component by the vector 32. Since an identical vertical and horizontal component are established on the opposite side of the housing, the horizontal components will cancel each other leaving only the vertical components. It will be immediately evident from Figure 3 that such vertical component varies substantially as the cosine of the angle "A." Therefore, a standard type rocket may be employed in combination with different deflector plate angle settings such that any particular load will be properly decelerated.

Minor modifications within the scope and spirit of this invention will occur to those skilled in the art. Therefore, the decelerating apparatus is not to be thought of as limited to the specific embodiment described and shown for illustrative purposes.

What is claimed:

1. A device for decelerating the sinking speed of a load dropped towards the earth comprising, in combination: a rocket; a frame support, said rocket being secured to said frame support above the center of gravity of said load to direct tthe exhaust stream of said rocket downwardly; deflector plates secured to said frame support below said rocket to intercept said exhaust stream and deflect portions thereof laterally; and means engaging said frame support and said plates and movable with respect to said frame support for varying the angle of said deflector plates with respect to the vertical so that the magnitude of the vertical thrust component of said portions can be varied.

2. The subject matter of claim 1, in which said deflector plates are hinged together in said frame in an inverted V-shape, with the apex of said V in the center of said exhaust stream to divide said exhaust stream from said rocket in substantially equal portions, and deflect said portions in laterally opposite directions such that the horizontal components of thrust established by said portions substantially cancel each other, said means for varying the angle of said deflector plates comprising support rods, said frame having openings to receive and support said support rods in different positions on said frame with respect to said apex of said V, said support rods engaging the underside of the free ends of said V-shape to vary the angle of said V.

References Cited in the file of this patent

UNITED STATES PATENTS

| | | |
|---|---|---|
| 2,414,284 | Bacon | Jan. 14, 1947 |
| 2,486,403 | Hattan | Nov. 1, 1949 |
| 2,539,643 | Smythe | Jan. 30, 1951 |
| 2,560,445 | Jackson | July 10, 1951 |
| 2,693,327 | Hild | Nov. 2, 1954 |
| 2,730,317 | Onian | Jan. 10, 1956 |
| 2,738,147 | Leech | Mar. 13, 1956 |

FOREIGN PATENTS

| | | |
|---|---|---|
| 479,936 | Italy | Apr. 17, 1953 |
| 986,713 | France | Apr. 4, 1951 |
| 1,115,776 | France | Jan. 16, 1956 |